United States Patent [19]

Dever

[11] 4,229,059

[45] Oct. 21, 1980

[54] BEARING ASSEMBLY

[76] Inventor: Alfred J. Dever, 18501 Hilliard, Rocky River, Ohio 44116

[21] Appl. No.: 957,285

[22] Filed: Nov. 2, 1978

[51] Int. Cl.² .................................................. F16C 33/30
[52] U.S. Cl. ................................. 308/236; 308/189 R
[58] Field of Search .......... 308/236, 177, 188, 189 R, 308/193, 214

[56] References Cited

U.S. PATENT DOCUMENTS

| | | |
|---|---|---|
| 50,477 | 10/1865 | Hill . |
| 436,357 | 9/1890 | King . |
| 576,665 | 2/1897 | Farrar . |
| 689,264 | 12/1901 | Whitehouse . |
| 954,957 | 4/1910 | Harriman et al. . |
| 2,118,885 | 5/1938 | Hughes ................................ 308/236 |
| 2,222,334 | 11/1940 | Brouwer . |
| 2,273,379 | 2/1942 | Searles ............................. 308/236 X |
| 2,873,128 | 2/1959 | Leister . |
| 3,036,872 | 5/1962 | King, Jr. et al. ..................... 308/236 |
| 3,160,429 | 12/1964 | Martins . |
| 3,239,292 | 3/1966 | Howe, Jr. et al. .................... 308/236 |
| 3,517,976 | 6/1970 | McAllister . |
| 3,920,342 | 11/1975 | Warda . |
| 4,124,258 | 11/1978 | Hafner ................................ 308/236 |

Primary Examiner—William D. Martin, Jr.

[57] ABSTRACT

An improved bearing assembly includes an eccentric locking ring which is utilized to lock an inner race member to a shaft. The inner race member has an eccentric groove with a depth which tapers between relatively deep and shallow portions of the groove. Similarly, the eccentric locking ring has a radial thickness which tapers between relatively thick and thin portions of the ring. When the locking ring is in a released condition, the relatively thick portion of the locking ring is disposed in the relatively deep portion of the groove. In order to lock the inner race in position on the shaft, the inner race and locking ring are rotated relative to each other so that the relatively thick portion of the locking ring is pressed firmly against the outer surface of the shaft by the circumferentially tapered groove in the inner race member. In order to hold the locking ring and inner race member in the locking condition, a set screw extends through a threaded passage into engagement with the relatively thin portion of the locking ring. In order to provide this screw thread with a solid connection to the inner race, the screw extends through a relatively thick wall portion of the inner race into the shallow portion of the eccentric groove.

8 Claims, 8 Drawing Figures

BEARING ASSEMBLY

BACKGROUND OF THE INVENTION

This invention relates to an improved bearing assembly and more specifically to an improved arrangement for connecting a bearing assembly with a shaft.

Bearing assemblies are commonly utilized to rotatably support a shaft. The bearing assembly frequently includes an inner race which is connected with the shaft and an outer race which is connected with a supporting structure. The inner and outer races are usually interconnected by a plurality of bearing elements, such as balls or rollers.

The inner race of the bearing assembly has previously been connected with the shaft by set screws. In one arrangement, a single set screw extends through the inner race into engagement with the shaft and holds the inner race against rotation relative to the shaft. In another arrangement a pair of set screws are mounted at circumferentially spaced apart locations about the inner race and engage the shaft to provide a relatively secure holding action between the inner race and the shaft. Both of these arrangements have the disadvantage that the set screws engage the shaft so that marking or scoring of the shaft can result.

In an effort to overcome the difficulties in using set screws, an eccentric locking ring has been utilized to grip the shaft. Such a locking ring is disclosed in U.S. Pat. No. 2,118,885. In this patent a set screw is utilized to interconnect the locking ring and the inner race of the bearing assembly. The set screw extends through a relatively thin portion of the wall of the inner race of the bearing assembly into engagement with a relatively thick portion of the eccentric locking ring. Therefore, the internal thread convolutions in the bearing wall have a relatively short axial extent and these thread convolutions are vulnerable to stripping if the set screw is overtightened. In addition, the holding action between the set screw, inner race of the bearing assembly and the locking ring may be such as to enable the set screw to work loose after an extended period of use.

SUMMARY OF THE INVENTION

The present invention provides a new and improved bearing assembly to rotatably support a shaft. The bearing assembly includes inner and outer races which enclose a circular array of bearing elements. The inner race of the bearing assembly is connected with the shaft by an improved locking arrangement. The locking arrangement includes an eccentric locking ring which is disposed in an eccentric groove in the inner bearing race. The locking ring has a relatively thick portion which is received in a relatively deep portion of the eccentric groove in the inner bearing race when the locking ring is in a released condition. Upon relative rotation between the locking ring and the inner bearing race, the thick portion of the locking ring is pressed against the outer surface of the shaft by the bottom of the eccentric groove in the inner race to firmly lock the shaft with the inner race of the bearing assembly.

In accordance with a feature of the present invention, the eccentric locking ring is held against rotation relative to the inner bearing race by a set screw which extends through a relatively thick portion of the wall of the inner race of the bearing assembly. The set screw engages a relatively thin portion of the locking ring. This arrangement tends to maximize the extent of the internal thread convolutions in the inner bearing race to minimize any tendency for the threads to be stripped if the set screw should be overtightened. In addition, the relatively large extent of the thread convolutions in the inner race of the bearing provides a secure holding action between the set screw and the inner race to prevent the set screw from working loose during extended use of the bearing assembly.

In one embodiment of the invention, the locking ring has a gap. Relatively thick portions of the locking ring taper in opposite directions from the gap to a relatively thin portion of the locking ring which is disposed diametrically opposite from the gap. In another embodiment of the invention, the locking ring is formed of sheet metal having a uniform thickness. A pair of recesses are formed on opposite sides of the gap in the locking ring to deform the metal radially outwardly to form bosses. The radially outwardly deformed portion of the sheet metal locking ring provides a relatively thick portion which cooperates with the eccentric groove in the inner bearing race to press the locking ring against a shaft.

In either embodiment of the invention, an indicator member is advantageously utilized to indicate the direction of relative rotation between the shaft and the bearing ring. The markings on the indicator member are such that they point in the direction in which the inner bearing race is rotated relative to the ring in order to release the bearing assembly.

Accordingly, it is an object of this invention to provide a new and improved assembly for rotatably supporting a shaft and wherein the assembly includes a ring member which is movable between a locking condition and a released condition and wherein a fastener extends through a relatively thick portion of an inner race of the bearing assembly into engagement with the lock ing ring to prevent relative rotation between the locking ring and the inner bearing race member.

Another object of this invention is to provide a new and improved assembly as set forth in the next preceding object and wherein the locking ring is formed of sheet metal and has an outwardly projecting portion formed by a stamped recess or boss in the sheet metal.

Still another object of the invention is to provide a new and improved assembly in accordance with the preceding objects and wherein an indicator member is utilized to indicate the direction of relative rotation between the locking ring and the inner bearing race.

BRIEF DESCRIPTION OF THE DRAWINGS

The foregoing and other objects and features of the present invention will become more apparent upon a consideration of the following description taken in conjunction with the accompanying drawings wherein.

DESCRIPTION OF THE PREFERRED EMBODIMENTS

It is the intention of the present invention to provide a device for locking a bearing assembly to a shaft in a manner which prevents damage to the shaft from forces exerted on the shaft. The specific locking device enables the shaft to be locked and unlocked repeatedly with no adverse affects to either the locking device or the shaft.

Figure 1:
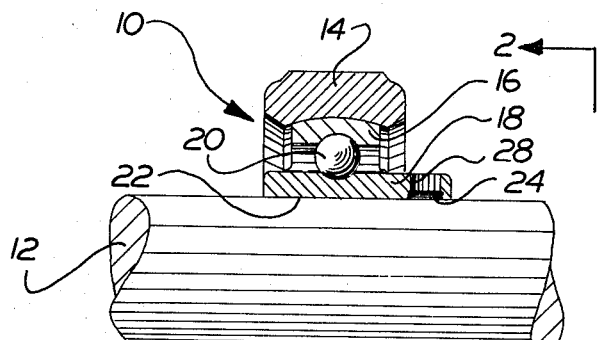
FIG. 1 is a sectional view illustrating the relationship between a shaft and a bearing assembly constructed in accordance with the present invention.

A mounted bearing assembly, indicated generally by reference numeral 10, with a shaft 12 locked therein is illustrated in FIG. 1. The bearing assembly 10 includes a case 14 provided with appropriate flanges 15 (FIG. 2) for mounting the bearing assembly on a surface or structure. Immediately adjacent to the case 14 is a generally cylindrical outer race 16 of the bearing assembly 10. The bearing assembly 10 further includes a cylindrical inner race member 18. A plurality of spherical ball bearings 20 are disposed in a circular array between the outer race 16 and inner race 18 of the bearing. The inner race 18 of the bearing extends axially beyond the outer race 16 and case 14 of the bearing assembly. The inner race 18 is provided with a cylindrical bore 22 of appropriate dimension to accommodate the shaft 12.

The bearing inner race member 18 has a cylindrical wall which terminates at radially extending end surfaces 18a and 18b. Near one end (to the right as shown in FIG. 1) of the inner race 18 there is an eccentric annular groove 24. The annular groove 24 extends from the bore 22 into the inner race member 18. The annular groove 24 is machined to be eccentric relative to the cylindrical bore 22 of the inner race (see FIG. 2). Thus, the central axis of the annular groove 24 extends parallel to and is spaced apart from the central axis of the bore 22.

The annular groove 24 cooperates with an eccentric ring 26 positioned therein. The width and thickness dimensions of the eccentric ring 26 correspond to like dimensions of the annular groove 24, normal machining tolerances accepted.

A cylindrical aperture 28 is provided through the inner race member 18 into the annular groove 24. The aperture 28 is of sufficient dimension to allow the pin of a spanner wrench to be inserted therein for holding or rotation. Radially opposite the aperture 28, likewise extending through the inner race into the annular groove 24, is a threaded aperture 30. A set screw 32 in the threaded aperture 30 is provided to lock the eccentric ring 26 against movement relative to inner bearing race 18.

Figure 3:
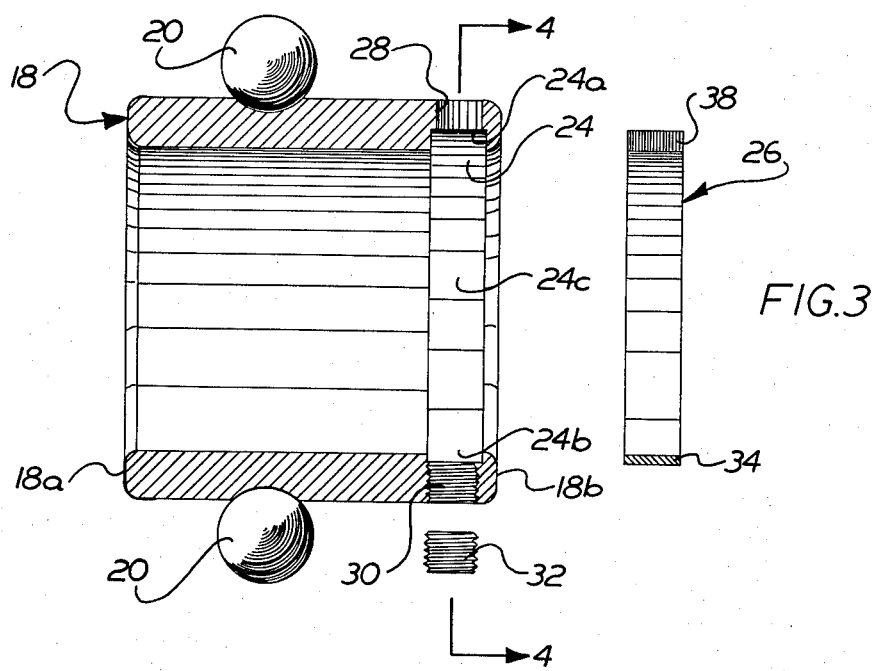
FIG. 3 is an exploded view, in cross section, of an inner bearing race member and an eccentric locking ring which form part of the bearing assembly of FIGS. 1 and 2.
Figure 4:
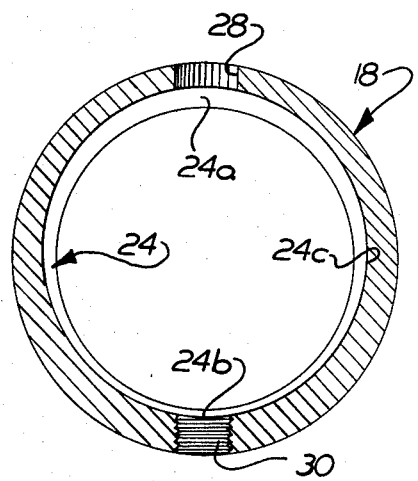
FIG. 4 is a sectional view, taken along line 4—4 of FIG. 3, illustrating an eccentric groove in the inner race member.

The threaded aperture 30 is located through the radially thickest portion of the wall of the inner race member 18. As a result of this placement, the aperture 30 extends into the annular groove 24 at the shallowest portion of the groove. Consequently, the spanner aperture 28 is positioned at the radially thinnest portion of the wall of the inner race 18. The spanner aperture 28 extends into the deepest portion of the annular groove 24. The importance of the placement of threaded aperture 30 is observed in FIGS. 3 and 4. At the thickest portion of the wall of the inner race 18 the greatest number of threads are available to engage the set screw 32. The positioning of the eccentric ring 26 within the annular groove 24 is illustrated in FIG. 3. A thinnest portion of the eccentric ring 26 is adjacent to the thickest portion of the inner bearing race 18.

The circumferential extent of the eccentric ring 26 is measurably less than the circumferential dimension of the annular groove 24. The purpose of the split ring design of eccentric ring 26 is to allow insertion of the ring 26 into the annular groove 24.

Figure 5:
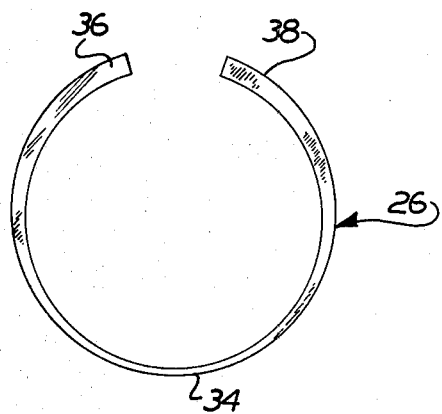
FIG. 5 is a plan view of the eccentric locking ring.

FIG. 5 shows the eccentric ring 26 in some detail. The eccentricity of the ring 26 is readily observable in FIG. 5. A thinnest portion 34 of the ring 26 is located at the mid-point of the circumferential dimension of the ring. The eccentric ring 26 has thickest portions 36 and 38 respectively at the extreme longitudinal ends of the ring which are disposed diametrically opposite the thinnest portion 34 of the ring.

Figure 6:
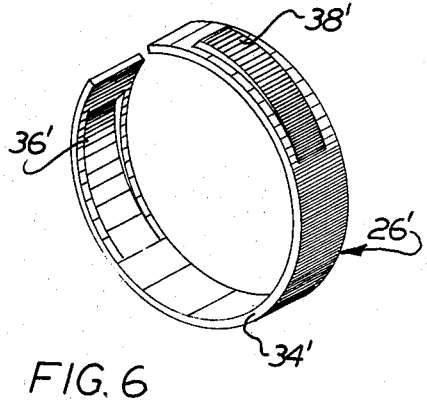
FIG. 6 is a perspective view of a second specific embodiment of the eccentric ring.

The eccentric ring 26 illustrated in FIG. 5 represents a first specific embodiment of the present invention. An alternative embodiment is shown in FIG. 6 wherein a stamped sheet metal eccentric ring 26' is illustrated. The width and circumferential dimensions of the stamped eccentric ring 26' correspond to like dimensions of the eccentric ring 26. The thickness of the stamped eccentric ring 26' is initially uniform throughout the longitudinal dimension and corresponds to the thickness at the thinnest portion 34 of ring 26. The longitudinal ends of the stamped ring 26' are provided with bosses or recesses through normal stamping procedures. The stamped bosses result in an increased radial thickness of the stamped ring 26' at these locations. A thinnest portion 34' of the ring 26' is located at a mid-point of the longitudinal length of the stamped ring 26'. Thickest portions 36' and 38' respectively are located at or near the extreme ends of the longitudinal dimension of the stamped ring 26'. The operation of the present invention is identical without regard for which embodiment of the eccentric ring 26 or 26' is used.

The eccentricity of both the annular groove 24 and ring 26 needs to be no more than 0.015 inch. While the interference of the ring 26 with the shaft may be as little as 0.005 to 0.030, an interference fit of 0.015 to 0.030 is adequate for locking of the shaft. Experimentation indicates that locking and unlocking is accomplished more quickly when the eccentricity is approximately 0.015 inch. The eccentricity and interference dimensions are identical regardless of whether ring 26 or stamped ring 26' is used.

Figure 2:
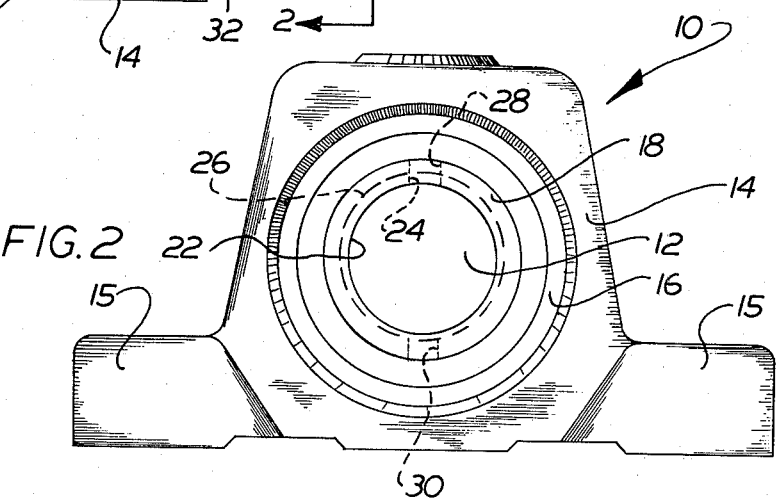
FIG. 2 is a side elevational view of the bearing assembly and shaft shown in FIG. 1.

The operation of the present invention may be understood from FIGS. 1 and 2. Once the bearing 10 and shaft 12 have been positioned relative to one another, the eccentric ring 26 (or 26') is pressed against the shaft 12 by the cylindrical bottom 24c of the groove 24'. This locks the inner bearing race in position on the shaft.

To lock the bearing race 18 in place, a spanner wrench (not shown in the diagrams) is attached to the bearing inner race 18 by inserting the spanner pin into the aperture 28. A slight rotational movement of the inner race 18 relative to the shaft 12 and ring 26 is provided. As a result of the slight rotational movement, the bearing inner race 18 is repositioned with respect to the eccentric ring 26. This repositioning of inner bearing race and eccentric ring, results in the shaft and bearing race being locked in position. The set screw 32 is tightened against the eccentric ring, with a light force. The light force applied to the set screw locks the relationship between the bearing race 18 and eccentric ring 26.

The locking of inner bearing race 18 to shaft 12 is possible an infinite number of times. In the event that a change is desired, the set screw 32 is loosened and a spanner wrench used to realign the relationship between inner bearing race 18 and eccentric ring 26. The relationship between the inner bearing race 18 and eccentric ring 26 may be provided in either a clockwise or counterclockwise position depending upon the desired rotation of the shaft 12.

Figure 7:
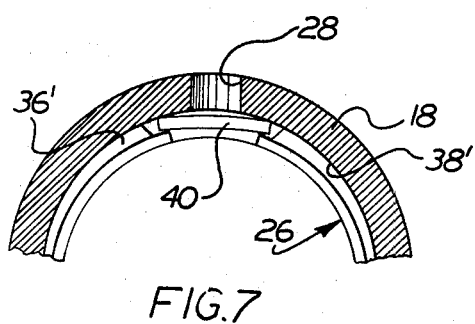
FIG. 7 is a fragmentary sectional view of a bearing inner race, the eccentric locking ring of FIG. 6 and an indicator member.

The present invention lends itself to a particularly unique method of indicating relationship between inner race 18 and eccentric ring 26. The inner race 18 and stamped eccentric 26' are shown in FIG. 7 in an unlocked position. The unlocked position corresponds to the spanner aperture 28 being positioned directly between the extreme ends of the longitudinal dimension of eccentric ring 26'.

Figure 8:
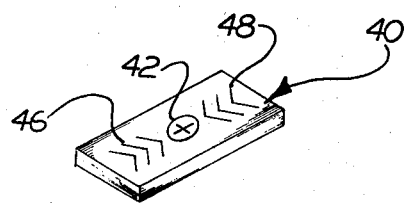
FIG. 8 is a perspective view of the indicator member, illustrating indicia which indicate the direction of relative movement between the inner bearing race and the indicator member.

A plastic indicator member 40 is placed within the opening between the inner race 18 and the extreme ends of stamped eccentric ring 26'. The indicator member 40, shown in FIG. 8, has dimensions dictated by the dimensions of the stamped eccentric ring 26'. The indicator member 40 includes an unlocked mark 42 positioned at the center of the member. A series of marks to the left of the unlocked mark 42 (as shown in FIG. 8) are referred as counterclockwise phase marks 46. An identical series of marks are located to the right of the unlocked mark 42 (as shown in FIG. 8) and referred to as clockwise phase marks 48.

When the relationship between the inner race 18 and stamped eccentric ring 26' are in a release or unlocked position, the unlocked mark 42 is observed through the spanner aperture 28. Upon slight rotational movement applied to the inner race 18 in a counterclockwise direction, the counterclockwise phase marks 46 are observed through the aperture 28. Likewise, upon rotational motion applied to the inner race 18 in a clockwise direction, the clockwise phase marks 48 are observed through the aperture 28. In this manner, the relationship between the inner race 18 and eccentric ring 26' may be determined at any point in time by observation through the aperture 28. The target as shown in FIGS. 7 and 8 render the locking and unlocking of the inner race to the shaft a simple task, regardless of the rotational direction of the shaft.

The unique target 40 device is useful for indicating the phase relationship of the bearing race 18 and the eccentric ring 26. The target device is located between the longitudinal ends 36 and 38 of the eccentric ring 26 positioned between the shaft 12 and inner bearing race 18. A spanner wrench aperture 28, provided in the inner race, allows citing of the target device 40 and thus indication of the phase relationship.

In view of the foregoing it is apparent that the present invention provides a new and improved bearing assembly 10 to rotatably support a shaft 12. The bearing assembly 10 includes inner and outer races 16 and 18 which enclose a circular array of bearing elements 20. The inner race 18 of the bearing assembly 10 is connected with the shaft by an improved locking arrangement. The locking arrangement includes an eccentric locking ring 26 which is disposed in an annular eccentric groove 24 in the inner bearing race 18. The locking ring has a relatively thick portion 36, 38 which is received in a relatively deep portion 24a of the eccentric groove in the inner bearing race when the locking ring is in a released condition. At this time the thin portion 34 of the locking ring 26 is disposed in a shallow portion 24b of the groove 24.

The locking ring 26 has cylindrical side surfaces which are axially offset relative to each other. An inner side surface of locking the ring is disposed in engagement with the outer side surface of the shaft 12. The outer side surface of the locking ring is disposed in engagement with the bottom of the groove 24.

Upon relative rotation between the locking ring and the inner bearing race, the thick portion of the locking ring is pressed against the outer surface of the shaft by the cylindrical bottom surface 24c of the eccentric groove 24 in the inner race 18 to firmly lock the shaft with the inner race of the bearing assembly. Thus, the central axis of the annular groove 24 is parallel to and offset upwardly (as viewed in FIGS. 1 and 3) from the central axis of the cylindrical bore 22. Rotation of the locking ring 26 in the groove 24 results in a wedging action between the groove and locking ring. This wedging action forces the locking ring radially inwardly into tight gripping engagement with the cylindrical outer surface of the shaft 12. In order to initiate the locking action, there must be frictional drag forces between the inner surface of the locking ring and the outer surface of the shaft.

In accordance with a feature of the present invention, the eccentric locking ring 26 is held against rotation relative to the inner bearing race 18 by a set screw 32 which extends through a relatively thick portion of the wall of the inner race of the bearing assembly. The set screw engages a relatively thin portion 34 of the locking ring 26. This arrangement tends to maximize the extent of the internal thread convolutions in the passage 30 in the inner bearing race to minimize any tendency for the threads to be stripped if the set screw should be overtightened. In addition, the relatively large extent of the thread convolutions in the inner race 18 of the bearing provides a secure holding action between the set screw and the inner race to prevent the set screw from working loose during extended use of the bearing assembly.

In one embodiment of the invention, the locking ring has a gap. Relatively thick portions 36 and 38 of the locking ring taper in opposite directions from the gap to a relatively thin portion 34 which is disposed diametrically opposite from the gap. In another embodiment of the invention, the locking ring is formed of sheet metal having a uniform thickness. A pair of recesses or bosses 36' and 38' are formed on opposite sides of the gap in the locking ring to deform the metal radially outwardly. The radially outwardly deformed portion of the sheet metal locking ring provides a relatively thick portion which cooperates with the eccentric groove in the inner bearing race to press the locking ring against a shaft.

In either embodiment of the invention, an indicator member 40 is advantageously utilized to indicate the direction of relative rotation between the shaft and the bearing ring. The markings 46, 48 on the indicator member 40 are such that they point in the direction in which the inner bearing race is rotated relative to the ring in order to release the bearing assembly.

Having described the specific preferred embodiments of the invention, the following is claimed:

1. An assembly for rotatably supporting a shaft, said assembly comprising a plurality of rotatable bearing elements disposed in a circular array, an outer race member circumscribing the circular array of bearing elements, an inner race member circumscribed by the circular array of bearing elements, said inner race member having a cylindrical inner surface adapted to engage the shaft and surface means for defining an annular groove which is disposed between opposite axial end portions of said cylindrical inner surface, said annular groove having a circular bottom surface with a central axis which is offset from the central axis of said cylindrical inner surface, said bottom surface of said groove having a first portion which is spaced apart from said cylindrical inner surface of said inner race member by a first distance to at least partially define a relatively deep part of said groove and a second portion which is spaced apart from said cylindrical inner surface of said inner race member by a second distance which is less than said first distance to at least partially define a relatively shallow part of said groove so that said inner race member has a relatively thin wall portion radially outwardly of said first portion of said bottom surface and a relatively thick wall portion radially outwardly of said second portion of said bottom surface, and retaining means for preventing relative rotation between said shaft and said inner race member, said retaining means comprising a ring member having a cylindrical outer surface and a cylindrical inner surface, said cylindrical outer surface of said ring member having a central axis which is offset from the central axis of said cylindrical inner surface of said ring member so that said ring member has a relatively thick first portion disposed between said cylindrical inner and outer surfaces of said ring member and a relatively thin second portion disposed between said cylindrical inner and outer surfaces of said ring member, said ring member being disposed in said annular groove in said inner race member with said cylindrical outer surface of said ring member disposed in abutting engagement with said bottom surface of said groove, said ring member and said inner race member being rotatable relative to each other between a released condition and a locking condition, said first portion of said ring member being pressed against the shaft by the bottom surface of said annular groove when said ring member and said inner race member are in the locking condition to thereby hold the shaft against rotation relative to said inner race member, said ring member having an axially extending gap in the relatively thick first portion of said ring member, said gap being defined by a pair of spaced apart end surfaces which are disposed diametrically opposite from said relatively thin second portion of said ring member, said retaining means including fastener means for holding said ring member and said inner race member in the locking condition, said fastener means including a fastener member which extends through an opening in the relatively thick wall portion of said inner race member into engagement with said relatively thin second portion of said ring member at a location where the outer surface of said arcuate member is disposed in engagement with the second portion of said bottom surface to tend to maximize the thickness of the portion of the inner race member through which said fastener member extends.

2. An assembly for rotatably supporting a shaft, said assembly comprising a plurality of rotatable bearing elements disposed in a circular array, an outer race member circumscribing the circular array of bearing elements, an inner race member circumscribed by the circular array of bearing elements, said inner race member having a cylindrical inner surface adapted to engage the shaft and surface means for defining an annular groove which is disposed between opposite axial end portions of said cylindrical inner surface, said annular groove having a circular bottom surface with a central axis which is offset from the central axis of said cylindrical inner surface, said bottom surface of said groove having a first portion which is spaced apart from said cylindrical inner surface of said inner race member by a first distance to at least partially define a relatively deep part of said groove and a second portion which is spaced apart from said cylindrical inner surface of said inner race member by a second distance which is less than said first distance to at least partially define a relatively shallow part of said groove so that said inner race member has a relatively thin wall portion radially outwardly of said first portion of said bottom surface and a relatively thick wall portion radially outwardly of said second portion of said bottom surface, and retaining means for preventing relative rotation between said shaft and said inner race member, said retaining means comprising a ring member having a cylindrical outer surface and a cylindrical inner surface, said cylindrical outer surface of said ring member having a central axis which is offset from the central axis of said cylindrical inner surface of said ring member so that said ring member has a relatively thick first portion disposed between said cylindrical inner and outer surfaces of said ring member and a relatively thin second portion disposed between said cylindrical inner and outer surfaces of said ring member, said ring member being disposed in said annular groove in said inner race member with said cylindrical outer surface of said ring member disposed in abutting engagement with said bottom surface of said groove, said ring member being formed from a single piece of material having a substantially uniform thickness throughout its length, said relatively thick first portion of said ring member being at least partially formed by a depression which extends circumferentially along a portion of said ring member, said ring member and said inner race member being rotatable relative to each other between a released condition and a locking condition, said first portion of said ring member being pressed against the shaft by the bottom surface of said annular groove when said ring member and said inner race member are in the locking condition to thereby hold the shaft against rotation relative to said inner race member, said retaining means including fastener means for holding said ring member and said inner race member in the locking condition, said fastener means including a fastener member which extends through an opening in the relatively thick wall portion of said inner race member into engagement with said relatively thin second portion of said ring member at a location where the outer surface of said arcuate member is disposed in engagement with the second portion of said bottom surface to tend to maximize the thickness of the portion of the inner race member through which said fastener member extends.

3. An assembly for rotatably supporting a shaft, said assembly comprising a plurality of rotatable bearing elements disposed in a circular array, an outer race member circumscribing the circular array of bearing elements, an inner race member circumscribed by the circular array of bearing elements, said inner race member having a cylindrical inner surface adapted to engage the shaft and surface means for defining an annular groove which is disposed between opposite axial end portions of said cylindrical inner surface, said annular groove having a circular bottom surface with a central axis which is offset from the central axis of said cylindrical inner surface, said bottom surface of said groove having a first portion which is spaced apart from said cylindrical inner surface of said inner race member by a first distance to at least partially define a relatively deep part of said groove and a second portion which is spaced apart from said cylindrical inner surface of said inner race member by a second distance which is less than said first distance to at least partially define a relatively shallow part of said groove so that said inner race member has a relatively thin wall portion radially outwardly of said first portion of said bottom surface and a relatively thick wall portion radially outwardly of said second portion of said bottom surface, and retaining means for preventing relative rotation between said shaft and said inner race member, said retaining means comprising a ring member having a cylindrical outer surface and a cylindrical inner surface, said cylindrical outer surface of said ring member having a central axis which is offset from the central axis of said cylindrical inner surface of said ring member so that said ring member has a relatively thick first portion disposed between said cylindrical inner and outer surfaces of said ring member and a relatively thin second portion disposed between said cylindrical inner and outer surfaces of said ring member, said ring member being disposed in said annular groove in said inner race member with said cylindrical outer surface of said ring member disposed in abutting engagement with said bottom surface of said groove, said ring member has an axially extending gap in the relatively thick first portion of said ring member, said relatively thick first portion of said ring member including a pair of circumferentially tapering depressions formed in said ring member, each of said depressions having a relatively deep end portion adjacent to said gap and tapering circumferentially from the relatively deep end portion to a second end portion which is spaced from said gap, said ring member and said inner race member being rotatable relative to each other between a released condition and a locking condition, said first portion of said ring member being pressed against the shaft by the bottom surface of said annular groove when said ring member and said inner race member are in the locking condition to thereby hold the shaft against rotation relative to said inner race member, said retaining means including fastener means for holding said ring member and said inner race member in the locking condition, said fastener means including a fastener member which extends through an opening in the relatively thick wall portion of said inner race member into engagement with said relatively thin second portion of said ring member at a location where the outer surface of said arcuate member is disposed in engagement with the second portion of said bottom surface to tend to maximize the thickness of the portion of the inner race member through which said fastener member extends.

4. An assembly for rotatably supporting a shaft, said assembly comprising a plurality of rotatable bearing elements disposed in a circular array, an outer race member circumscribing the circular array of bearing elements, an inner race member circumscribed by the circular array of bearing elements, said inner race member having a cylindrical inner surface adapted to engage the shaft and surface means for defining an annular groove which is disposed between opposite axial end portions of said cylindrical inner surface, said annular groove having a circular bottom surface with a central axis which is offset from the central axis of said cylindrical inner surface, said bottom surface of said groove having a first portion which is spaced apart from said cylindrical inner surface of said inner race member by a first distance to at least partially define a relatively deep part of said groove and a second portion which is spaced apart from said cylindrical inner surface of said inner race member by a second distance which is less than said first distance to at least partially define a relatively shallow part of said groove so that said inner race member has a relatively thin wall portion radially outwardly of said first portion of said bottom surface and a relatively thick wall portion radially outwardly of said second portion of said bottom surface, and retaining means for preventing relative rotation between said shaft and said inner race member, said retaining means comprising a ring member having a cylindrical outer surface and a cylindrical inner surface, said cylindrical outer surface of said ring member having a central axis which is offset from the central axis of said cylindrical inner surface of said ring member so that said ring member has a relatively thick first portion disposed between said cylindrical inner and outer surfaces of said ring member and a relatively thin second portion disposed between said cylindrical inner and outer surfaces of said ring member, said ring member being disposed in said annular groove in said inner race member with said cylindrical outer surface of said ring member disposed in abutting engagement with said bottom surface of said groove, said ring member being formed of sheet metal having a substantially uniform thickness, said relatively thick first portion of said ring member being formed by a pair of circumferentially extending recesses which taper circumferentially around said ring member and have relatively deep end portions disposed diametrically opposite from said relatively thin second portion of said ring member, said ring member and said inner race member being rotatable relative to each other between a released condition and a locking condition, said first portion of said ring member being pressed against the shaft by the bottom surface of said annular groove when said ring member and said inner race member are in the locking condition to thereby hold the shaft against rotation relative to said inner race member, said retaining means including fastener means for holding said ring member and said inner race member in the locking condition, said fastener means including a fastener member which extends through an opening in the relatively thick wall portion of said inner race member into engagement with said relatively thin second portion of said ring member at a location where the outer surface of said arcuate member is disposed in engagement with the second portion of said bottom surface to tend to maximize the thickness of the portion of the inner race member through which said fastener member extends.

5. An assembly as set forth in claim 4 further including means disposed between the relatively deep end portions of said depressions for indicating the direction of relative rotation between said ring member and said inner race member.

6. An assembly for rotatably supporting a shaft, said assembly comprising a plurality of rotatable bearing elements disposed in a circular array, an outer race member circumscribing the circular array of bearing elements, an inner race member circumscribed by the circular array of bearing elements, said inner race member having a cylindrical inner surface adapted to engage the shaft and surface means for defining an annular groove which is disposed between opposite axial end portions of said cylindrical inner surface, said annular groove having a circular bottom surface with a central axis which is offset from the central axis of said cylindrical inner surface, said bottom surface of said groove having a first portion which is spaced apart from said cylindrical inner surface of said inner race member by a first distance to at least partially define a relatively deep part of said groove and a second portion which is spaced apart from said cylindrical inner surface of said inner race member by a second distance which is less than said first distance to at least partially define a relatively shallow part of said groove so that said inner race member has a relatively thin wall portion radially outwardly of said first portion of said bottom surface and a relatively thick wall portion radially outwardly of said second portion of said bottom surface, and retaining means for preventing relative rotation between said shaft and said inner race member, said retaining means comprising a ring member having an outer surface and an inner surface, said outer surface of said ring member having a central axis which is offset from the central axis of said inner surface of said ring member so that said ring member has a relatively thick first portion and a relatively thin second portion, said ring member being disposed in said annular groove in said inner race member with said outer surface of said ring member disposed in abutting engagement with said bottom surface of said groove, said ring member being formed of a single piece of material having a substantially uniform thickness, said relatively thick first portion of said ring member being formed by circumferentially extending recess portions which taper circumferentially around said ring member and have relatively deep end portions disposed diametrically opposite from said relatively thin second portion of said ring member, said ring member and said inner race member being rotatable relative to each other between a released condition and a locking condition, said first portion of said ring member being pressed against the shaft by the bottom surface of said annular groove when said ring member and said inner race member are in the locking condition to thereby hold the shaft against rotation relative to said inner race member.

7. An assembly as set forth in claim 6 wherein said retaining means further includes fastener means for holding said ring member and said inner race member in the locking condition, said fastener means including a fastener member which extends through an opening in the relatively thick wall portion of said inner race member into engagement with said relatively thin second portion of said ring member at a location where the outer surface of said arcuate member is disposed in engagement with the second portion of said bottom surface to tend to maximize the thickness of the portion of the inner race member through which said fastener member extends.

8. An assembly as set forth in claim 6 further including means disposed adjacent to the relatively deep end portions of said recess portions for indicating the direction of relative rotation between said ring member and said inner race member.

* * * * *